(12) United States Patent
Stieglitz

(10) Patent No.: US 7,293,975 B2
(45) Date of Patent: Nov. 13, 2007

(54) CALIBRATION DEVICE

(75) Inventor: Henning Stieglitz, München (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/552,026

(22) PCT Filed: Mar. 30, 2004

(86) PCT No.: PCT/EP2004/003333

§ 371 (c)(1),
(2), (4) Date: Oct. 24, 2005

(87) PCT Pub. No.: WO2004/087400

PCT Pub. Date: Oct. 14, 2004

(65) Prior Publication Data

US 2006/0240134 A1   Oct. 26, 2006

(30) Foreign Application Priority Data

Apr. 3, 2003  (DE) .................. 103 15 125

(51) Int. Cl.
*B29C 47/90* (2006.01)
(52) U.S. Cl. ............ 425/326.1; 425/71; 425/392
(58) Field of Classification Search .......... 425/71, 425/325, 326.1, 388, 392
See application file for complete search history.

(56) References Cited

U.S. PATENT DOCUMENTS 2,847,036 A * 8/1958 Dow ................... 138/45
3,958,913 A    5/1976 Stangl
3,980,418 A * 9/1976 Schott, Jr. .............. 425/72.1
5,480,295 A * 1/1996 Greve ................... 425/71

FOREIGN PATENT DOCUMENTS

DE    198 43 340    4/2000
JP    2001 287258   10/2001

* cited by examiner

*Primary Examiner*—Robert Davis
*Assistant Examiner*—Joseph Leyson
(74) *Attorney, Agent, or Firm*—Henry M. Feiereisen; Ursula B. Day

(57) ABSTRACT

A calibration device for calibrating extruded continuous profiles includes successively arranged segment rings comprised of individual segments whose internal surfaces jointly form a calibration opening. Successively axially arranged segments are assembled in the form of a segment block. The segments of each segment block are arranged on a support structure and the segment blocks are arranged, in an essentially circular form, in a housing such that the axially adjacent segments partially overlap. Each support structure is connected to a mounting and operating device by which the individual segment blocks are fixed to the housing. Adjustment of each segment block is carried out in axial direction. The mounting and operating device is divided into two parts, wherein a first part is connected to the support structure, and a second part is received in the housing, and the two parts are connected with one another in a separable manner.

7 Claims, 3 Drawing Sheets

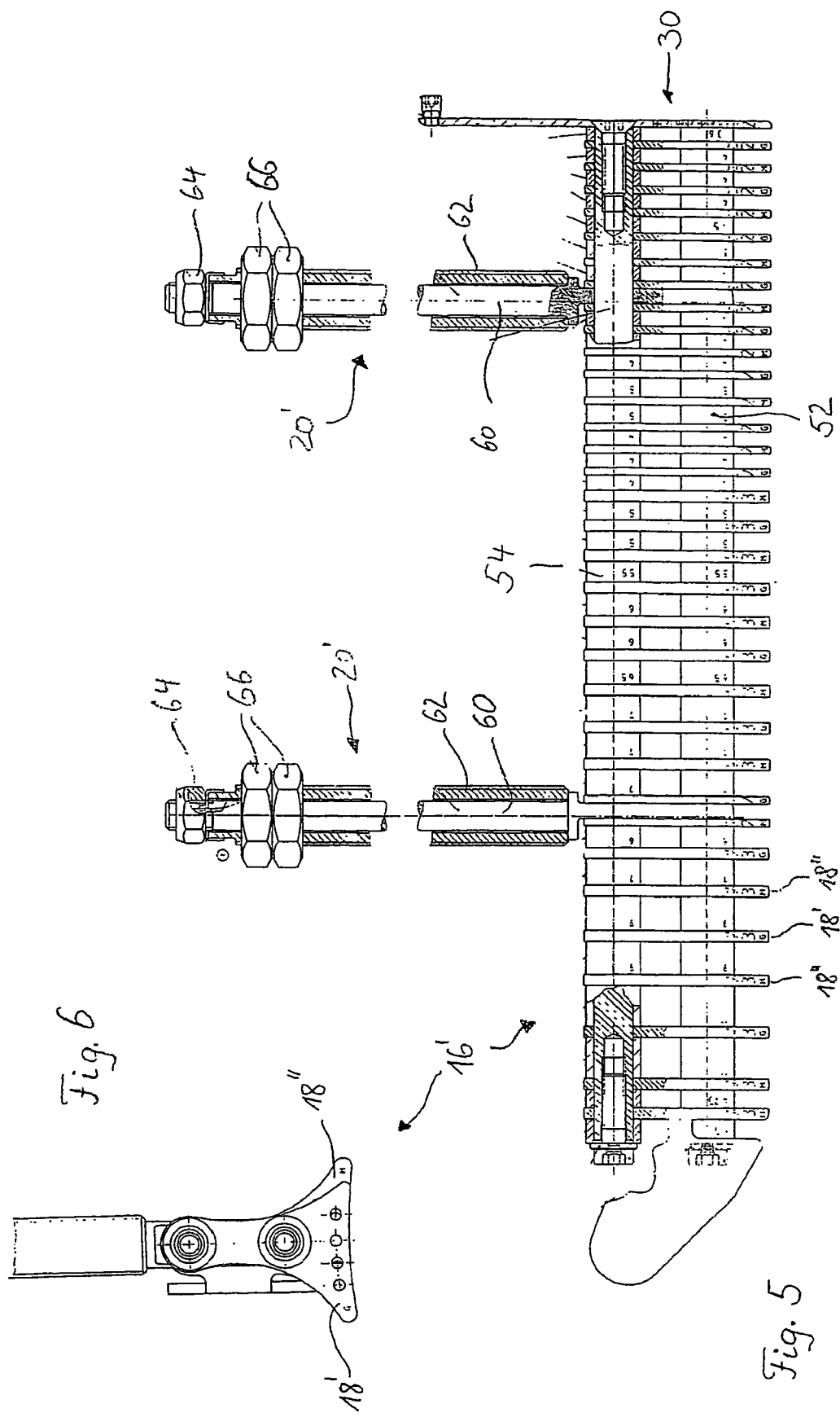

CALIBRATION DEVICE

This application is the National Stage of International Application PCT/EP04/03333, filed on Mar. 30, 2004, which claims foreign priority to German Application 103 15 125.7, filed on Apr. 3, 2003.

BACKGROUND OF THE INVENTION

The invention relates to a calibration device.

Calibration devices are used, for example, for calibrating extruded continuous profiles, in particular tubes. Plastic melt is hereby initially prepared in an extruder and shaped by an exit nozzle. To assure the desired dimensioning of the continuous profile, the latter travels through the calibration device after the shaping operation for providing precise size thereof.

Up to some time ago, the production of plastic tubes required the availability of various calibration devices for different wall thicknesses or outer diameters. Hereby, the tools needed to be replaced, requiring a shutdown of the machine which leads to downtimes.

DE 198 43 340 C2 thus proposed to use an adjustable calibration device for different tube dimensions. This calibration device includes a plurality of lamellae which are distributed in spaced-apart relationship about the circumference on the outer sides of the tube to be sized. Viewed in production direction of the tube, a plurality of such lamellae rings is disposed within a calibration station, with the individual lamellae of the individual lamellae rings positioned with clearance to thereby permit easy adjustment of the lamellae of the individual rings in relation to the lamellae of the subsequent ring or the preceding ring. The lamellae are united in segments to form a lamellae block and supported by a holding structure. The holding structure in turn is connected to the housing for radial adjustment.

A problem of this construction of the calibration device is however the single-piece configuration of the holding structure. It has been shown during production of the calibration device that part of the holding structure, namely the adjustable part, must be first inserted in the housing. Then, the individual lamellae are secured to the support and holding structure in a manner that is difficult to implement.

SUMMARY OF THE INVENTION

It is an object of the present invention, to provide a calibration device which can be made and assembled in a simple manner.

This object is attained by a calibration device for calibrating extruded continuous profiles, in particular tubes, which includes a plurality of segment rings which are disposed behind one another and include individual segments and whose inner surface jointly define a calibrating opening, wherein segments disposed behind one another in axial direction are combined to a segment block, wherein the individual segments of each segment block are arranged on a support structure, wherein the segment blocks are received in substantial circular manner in a housing such that axially adjacent segments partially overlap in each position in circumferential direction, and wherein each support structure is connected with at least one mounting and operating device which restrains the individual segment blocks, associated to a respective support structure, in the housing, and enables an adjustment of each individual segment block in radial direction, wherein each mounting and operating device is made of two parts, with a first part connected with the support structure, and a second part received in the housing, and with both parts connected with one another in a detachable manner.

The basic idea of the present invention is the construction of the mounting and operating device itself in two parts, whereby a first part of the mounting and operating device may be received in the housing independently from a second part. The second part of the mounting and operating device may serve as part of the support structure or may be connected therewith. This enables the arrangement of the individual lamellae on the support structure outside the housing so that the support structure can then—while the segment blocks are completed as such—be installed in the housing. Both parts of the mounting and operating device are hereby connected to one another.

This construction has proven advantageous especially in those circumstances when the second part of the mounting and operating device, received in the housing, is configured for radial adjustment of the respective segment blocks and oftentimes is thus incorporated in the housing in a structurally complex manner.

According to a preferred embodiment, the mounting and operating device is constructed in the form of a spindle drive, wherein—according to an embodiment—a spindle is arranged upon the support structure with an outer thread portion. The outer thread portion interacts with a spindle nut which is rotatably driven via a further drive element. The spindle is hereby constructed in two parts, with a first part connected to the support structure, and with a second part which includes the outer thread portion.

The connection of both parts of the mounting and operating device may involve a latch, a screw connection or similar conventional connection mechanisms.

A particularly simple embodiment is characterized by the construction of the second part of the spindle, received in the housing, substantially in the form of a threaded rod with an outer thread.

The support structure may include a rod or a bar for successive stringing of individual segments of a segment block. The segments are spaced from one another at predefined distances by spacer sleeves. The first part of the spindle would then be connected with such a rod or bar of the support structure. Preferably, this part may hereby be provided with a bore for passage of the rod or bar. Of course, it is also possible to stabilize the entire device by providing two or more rods or bars for the support structure. As an alternative, the support structure may also be constructed differently.

A further preferred embodiment of the invention is characterized in that the spindles are each comprised of a spindle mounting and a spindle sleeve. The spindle mounting includes a spindle rod and an adjacent part which is connected to the support structure. The spindle rod is received with precision fit and fixedly securable in the spindle sleeve. In this embodiment, the spindle sleeve having an outer thread could be inserted into the housing without the spindle rod. The individual segment blocks could then be placed in a pertaining spindle sleeve into the housing by inserting the respective spindle rod. Once placed, the respective spindle rods and spindle sleeves are braced with one another, by a screwed connection for example, so as to realize a securement of spindle mounting and spindle sleeve.

Securement may be realized for example by providing a thread at the end of the spindle rod in opposition to the support structure, and by threadably engaging a nut on the spindle to secure or clamp the spindle sleeve in relation to the spindle rod.

BRIEF DESCRIPTION OF THE DRAWING

Two preferred embodiments of the invention will now be described in greater detail with reference to the attached drawings in which:

FIG. 4a shows a side view of a first embodiment of a spindle support for retaining a segment block, FIG. 4b shows an end view of the spindle support of FIG. 4a;

FIG. 5 shows a further segment block with a further embodiment of a spindle support, and FIG. 6 shows a partial frontal view of a segment block.

DETAILED DESCRIPTION OF PREFERRED EMBODIMENTS

A complete arrangement of an apparatus for making a plastic tube can be gathered from DE 198 43 340 C2 which already illustrates an adjustable calibration device. The adjustable calibration device is hereby a core component of a tube extrusion plant with option to change dimensions. It assumes the shaping task of a standard calibration, but may be infinitely adjustable across a diameter range which is predefined based on the construction.

Figure 1:
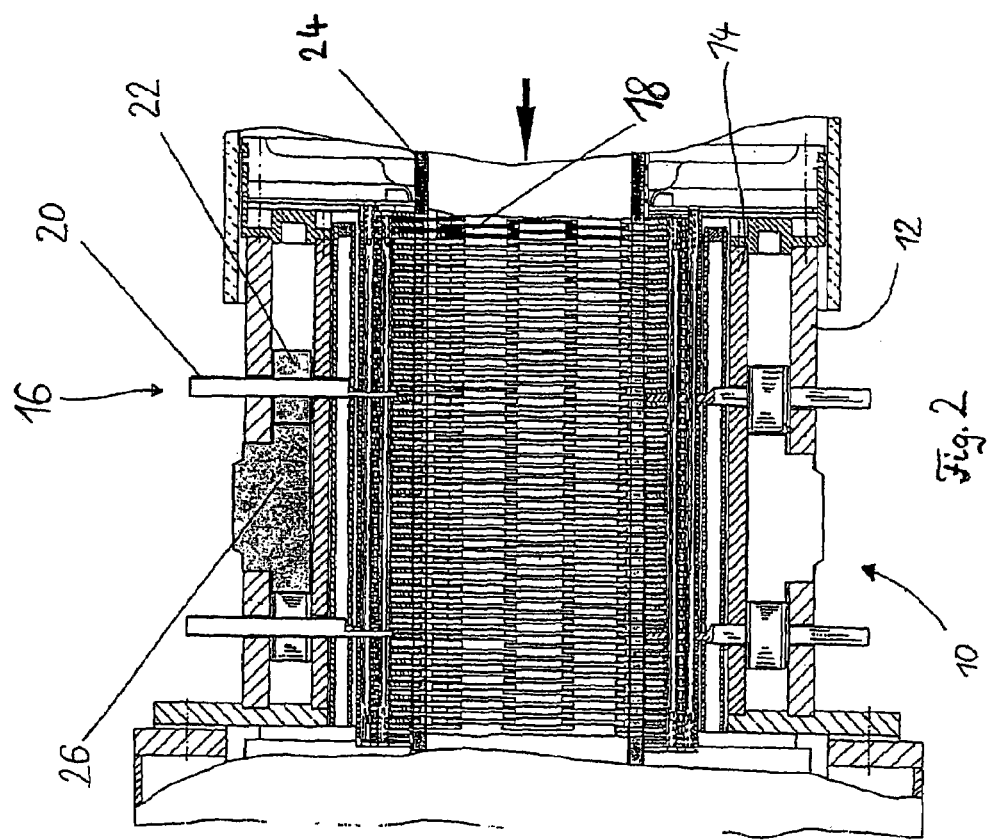
FIG. 1 shows a schematic sectional illustration of an embodiment of a calibration device according to the invention in perpendicular relationship to the production direction of a tube.

This adjustment is rendered possible by forming the surface, which bears upon the tube, with a great number of individual segments. The segments 18 illustrated in FIG. 1 are rounded along their circumferential direction of the tube in correspondence with the greatest possible outer tube diameter and are united to single segment rings. These segment rings are arranged in production direction in spaced-apart relationship, positioned however snugly fitted behind one another. Two successive segment rings are combined to a dimension ring and arranged in offset relationship with clearance. This ensures the absence of any edges during passage of the tube through the calibration device. The individual segment surfaces form jointly a substantially smooth inner tube surface with substantially circular geometry.

Figure 3:
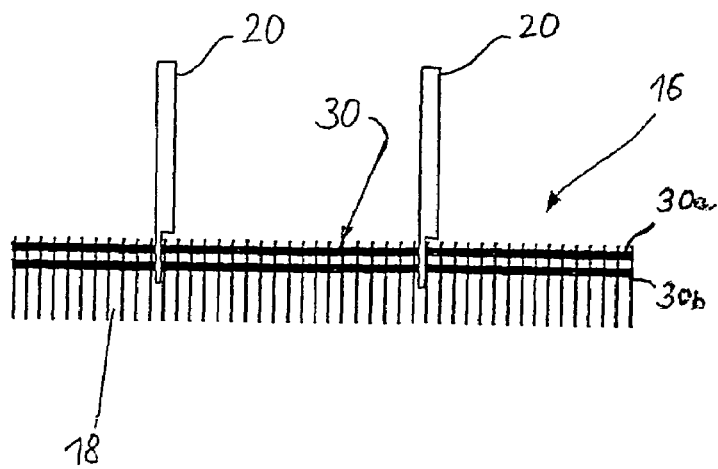
FIG. 3 shows a schematic simplified illustration of an individual segment block from the calibration device of FIGS. 1 and 2.

The segments 18 positioned axially behind one another in production direction of the tube are united to form a segment block. Used hereby is a support structure 30 as will be described hereinafter in greater detail with reference to FIG. 5. The support structure 30 is connected with a mounting and operating device 20 which connects the respective segment blocks with the housing of the calibration device for radial adjustment. The housing of the calibration device includes according to the exemplary embodiment of FIG. 1 two cylinder portions 12 and 14 arranged coaxially within one another. Received in these cylinder portions in the form of a circle are the individual segment blocks 16. A single segment block 16 of the first embodiment is depicted schematically in FIG. 3.

Figure 4:
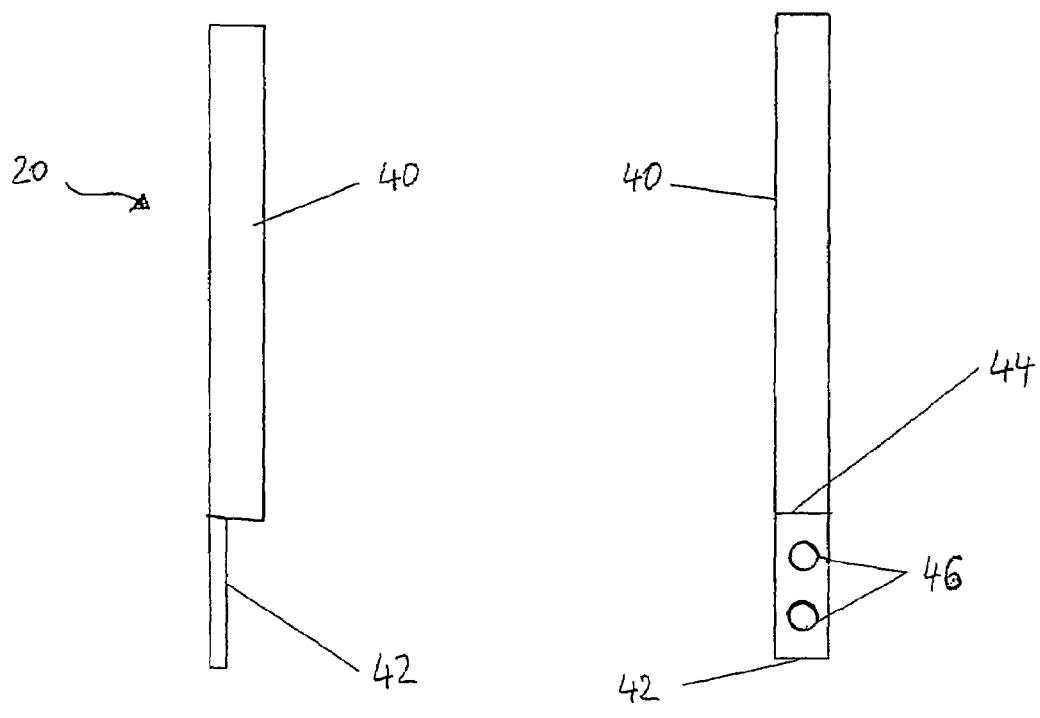

It includes lamellae 18 arranged behind one another and secured to two support rods 30a, 30b. The support rods 30a, 30b form the support structure 30. Disposed on the support rods 30a, 30b in turn are two spindle carriers 20 spaced in axial direction from one another. The spindle carriers 20 are shown in two views in FIGS. 4a, 4b and include an attachment portion 42, which has two bores 46 for passage of the support rods 30a, 30b so as to be connected or connectable to the support structure 30, and a threaded rod 40. The threaded rod 40 and the attachment portion 42 are detachably connectable with one another at the connection position 44, for example by an unillustrated screw connection, clamp connection, latch connection or other connection.

When the calibration device is completely assembled, the externally threaded rods 40 are received in associated bores of the housing cylinders 12 and 14. Provided for each externally threaded rod is a gear nut 22 between both housing cylinders 12 and 14 for interaction with the outer thread of the externally threaded rod 40 in an adjustable manner.

Figure 2:
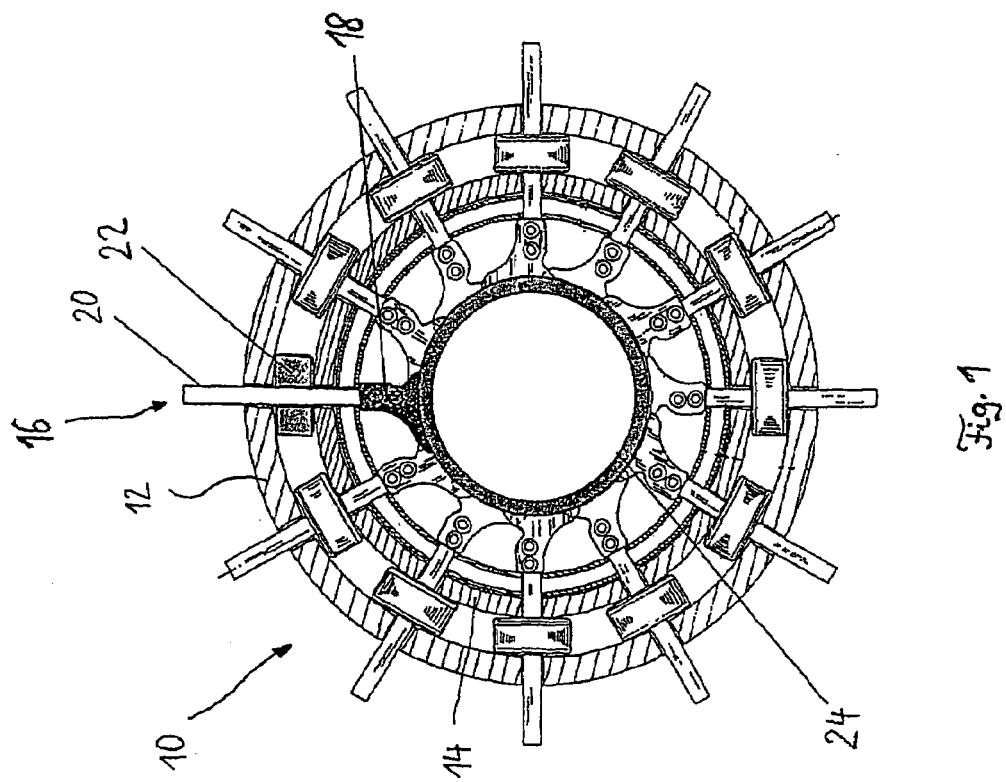
FIG. 2 shows a schematic sectional illustration of a calibration device like in FIG. 1 in parallel relationship to the production direction.

Disposed in form of a circle in perpendicular relationship to the production direction of the tube 24 (compare FIG. 1) are 12 segment blocks. Each segment block includes two spindle carriers 20 disposed in axially spaced-apart relationship (FIG. 2) and respectively interacting with a pertaining gear nut 22. The gear nuts 22 in turn are adjusted in unison by a gear ring 26 which extends on the circumference between the axially spaced gear nuts 22. The gear ring 26 includes hereby on both its edges teeth which mesh with the gear nuts 22.

Actuation of the gear ring 26 enables radially outward or inward adjustment of all segment blocks simultaneously and in a same manner. Radial adjustment of all segment blocks in like manner establishes a variable calibration diameter. Thus, the outer diameter of the tube 24 to be calibrated can be defined within the adjustment range.

An advantage of the present embodiment is the two-part construction of the mounting and operating device configured in the form of spindle carriers 20. This enables the insertion of the externally threaded rods 40 into the housing 12, 14 and their respective alignment. Parallel thereto, the segment blocks 16 can be established by lining up the individual segments 18 on the support structure 30. The support structure 30 is hereby firmly connected also with the attachment portion 42.

As a consequence of the connection option between the attachment portion 42, on one hand, and outer thread portion 40, on the other hand, the individual segment blocks 16 can easily be placed into the housing 12, 14 without any problem. In this way, the calibration device can be manufactured in a simple and cost-efficient manner.

A further embodiment of the invention is illustrated in FIGS. 5 and 6 which depict in more detail a segment block 16'. This segment block 16' includes two different lamellae configurations 18' and 18" disposed in alternating relationship. Each lamellae includes two bores and is thus strung on retention rods 52 and 54. The individual lamellae 18' and 18" are hereby separated from one another by spacers. Disposed on the ends of the retention rods 52 and 54 are internal threads so that insertion of a screw enables a bracing of all segments 18' and 18" with one another.

Received at two axial positions are a lower part of a spindle rod 60 instead of the spacer sleeves. The spindle rod 60 includes two bores through which the retention rods 52 and 54 extend. The spindle rod 60 has the shape of a pin above the attachment portion and terminates at its upper end with an outer thread. Pushed over the spindle rod 60 is a spindle sleeve 62 which has an outer thread at its outer circumference. The spindle sleeve 62 bears with its lower end upon a seat of the spindle rod 60. At the upper end, the spindle sleeve is secured to the spindle rod 60 through screwed connection of the screw 64 to the outer thread of the spindle rod.

When a calibration device is assembled in accordance with the second embodiment, the lower part of the segment block 16' can be made while the spindle rod 60 and spindle sleeve 62 are still separate, by pushing the individual lamellae 18' and 18" onto the respective support rods 52 and 54 using the spacer sleeves, and subsequent threaded engagement to the ends of the retention rods 52 and 54. The two spindle rods 60 are hereby integrated in the support structure 30' in axially-spaced-apart relationship.

Parallel thereto, the spindle sleeves 62 are inserted in the calibration housing, not shown in greater detail here, and respectively adjusted. Then, the lower parts of the segment blocks 16' are inserted into the respective spindle sleeve 62 through insertion of the spindle rods 60. The segment blocks 16' are then firmly mounted in the housing by tightening the screw 64 and accompanying fixation of the spindle rods and spindle sleeves 62.

In summary, the present invention ensures a simple and thus cost-efficient assembly of the calibration device.

What is claimed is:

1. A calibration device for calibrating extruded continuous profiles, in particular tubes, comprising:
    a plurality of segment rings which are disposed behind one another and include individual segments and whose inner surface jointly define a calibrating opening, wherein the segments disposed behind one another are combined to a segment block, and the segments of each segment block are arranged on a support structure,
    a housing for receiving the segment blocks in substantial circular manner such that axially adjacent segments partially overlap in each position in circumferential direction, said segment blocks being fully enclosed by the housing, and
    at least one mounting and operating device connected to each support structure to restrain the segment blocks, associated to the respective support structure, in the housing, and to enable an adjustment of each segment block in radial direction, wherein each mounting and operating device is made of two parts, with a first part connected with the support structure, and a second part received in the housing, wherein both parts of the mounting and operating device are detachably connected with one another.

2. The calibration device according to claim 1, wherein the mounting and operating device is constructed as spindle drive which includes a spindle having an outer thread portion and arranged on the support structure, and a gear nut interacting with the outer thread portion and rotatably driven via a further drive element, said spindle being made of two parts, with a first part connected to the support structure, and a second part formed with the outer thread portion.

3. The calibration device according to claim 2, wherein the second part of the spindle is received in the housing and configured in the form of a rod provided with said outer thread portion.

4. The calibration device according to claim 2, wherein the support structure for the segments of a segment block includes at least one rod on which the segments are lined up, said rod received in a bore of the first part of the spindle.

5. The calibration device of claim 2, further comprising a second said spindle, wherein the two spindles are disposed on the support structure in axially offset relationship.

6. The calibration device according to claim 2, wherein the spindle includes a first spindle mounting and a spindle rod, wherein the spindle mounting is connected to the support structure and the spindle rod is received at substantial precision fit in a spindle sleeve provided with an outer thread, and wherein the spindle mounting and the spindle sleeve are securable relative to one another.

7. The calibration device according to claim 6, wherein the spindle rod has a threaded end in opposition to the support structure, said spindle sleeve securable in relation to the spindle rod by threadably engaging a nut upon the threaded end of the spindle rod.

* * * * *